I. F. PECK.
BREAD WRAPPING MACHINE.
APPLICATION FILED MAY 8, 1909.

956,994.

Patented May 3, 1910.

9 SHEETS—SHEET 1.

Witnesses:
F. R. Roulstone
E. Batchelder

Inventor:
Ira F. Peck
By Wright Brown Quinby May
Attys.

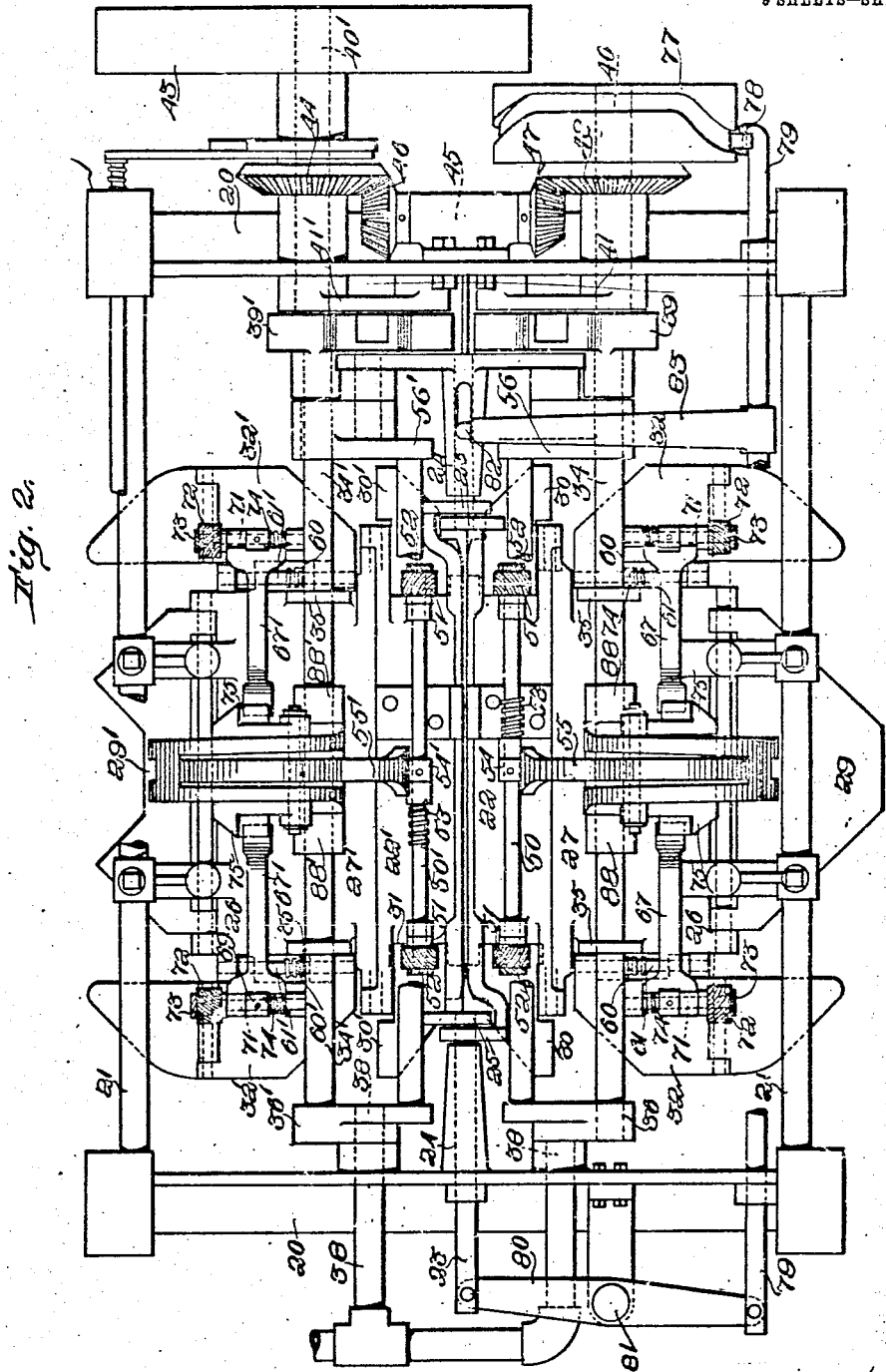

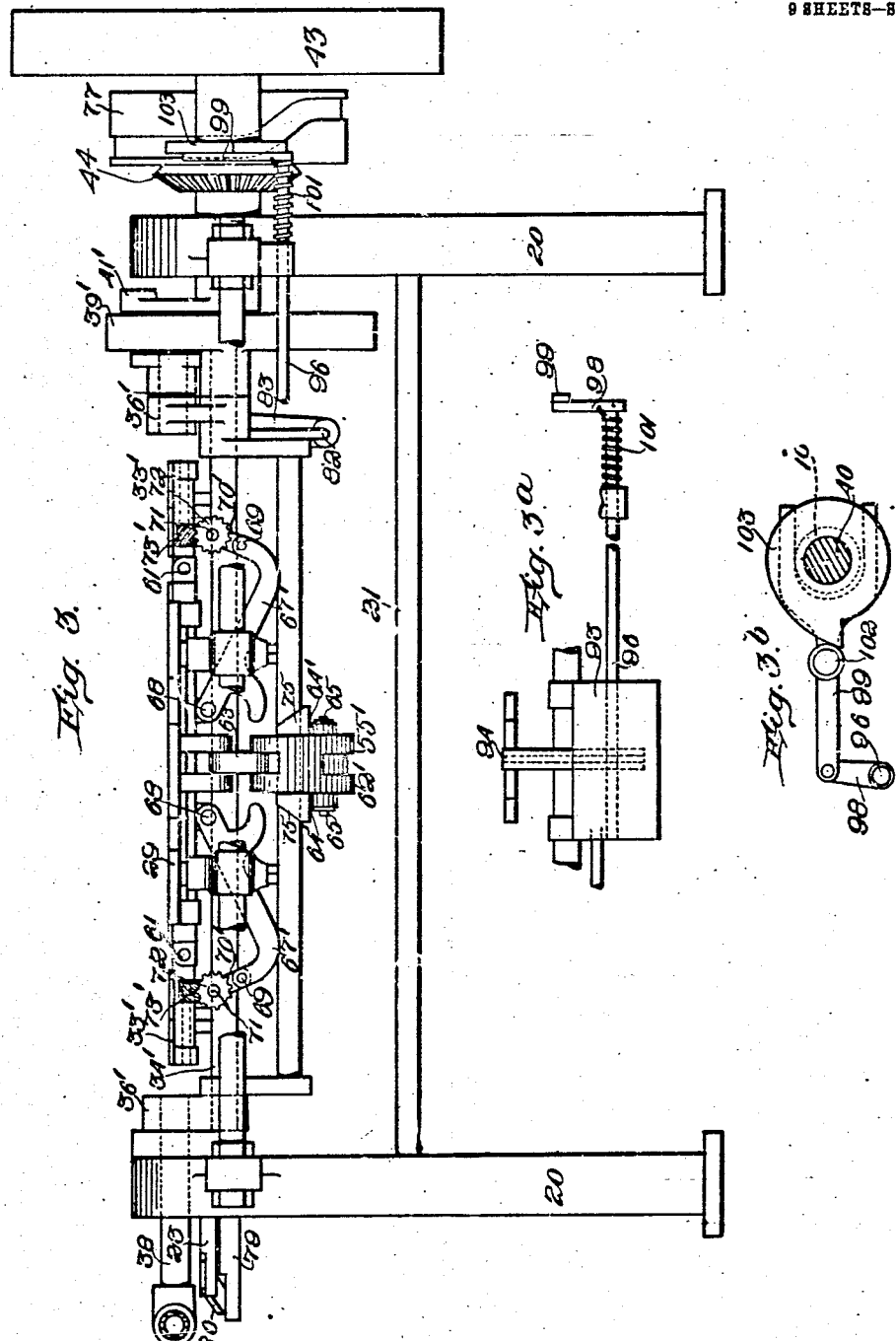

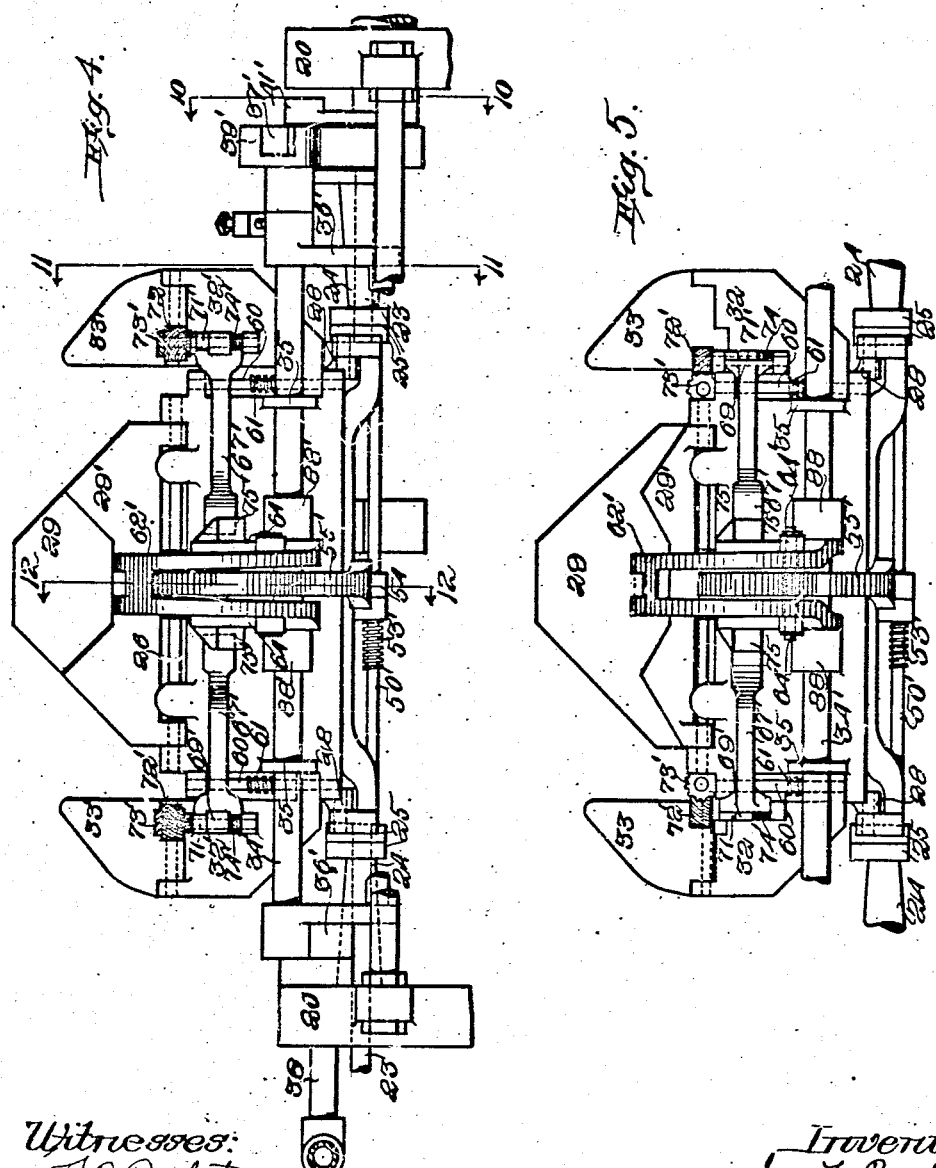

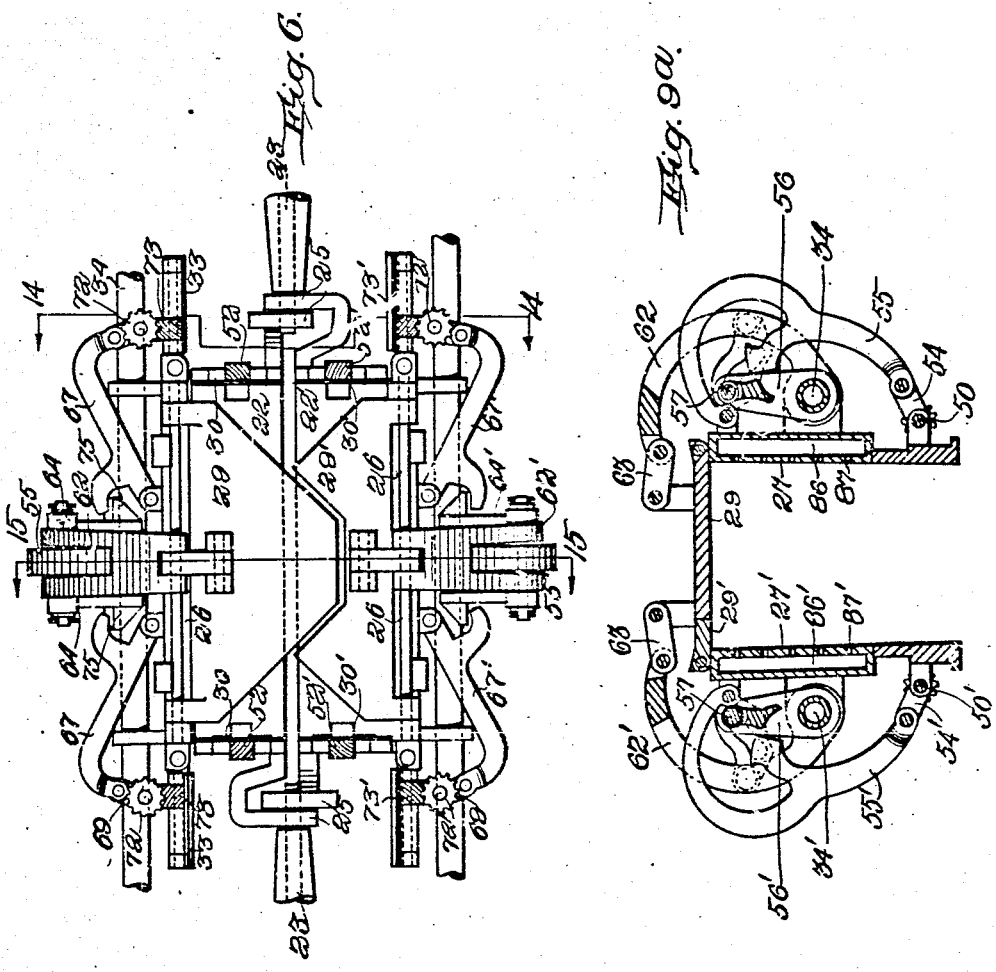

I. F. PECK.
BREAD WRAPPING MACHINE.
APPLICATION FILED MAY 8, 1909.
956,994.
Patented May 3, 1910.
9 SHEETS—SHEET 6.
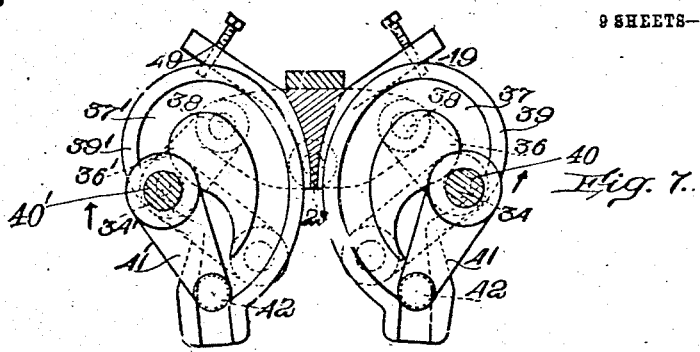
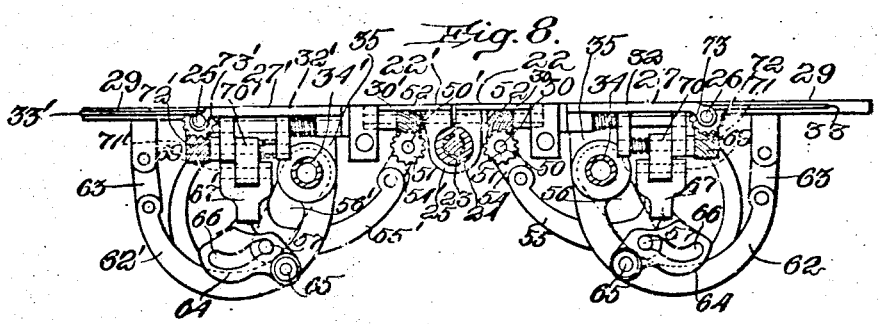
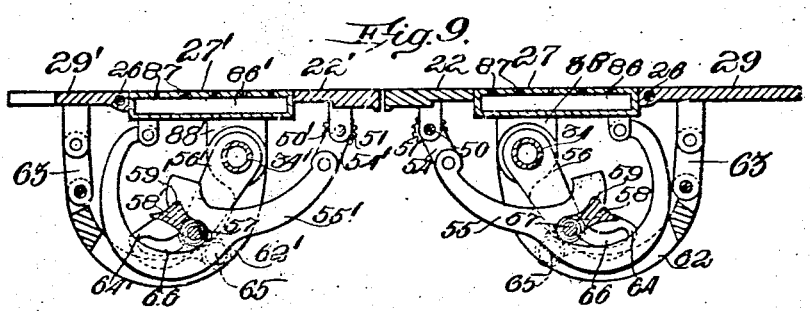
Witnesses:
F. R. Roulstone
E. Batchelder
Inventor:
Ira F. Peck
by Wright, Brown, Quinby & May
Attys.

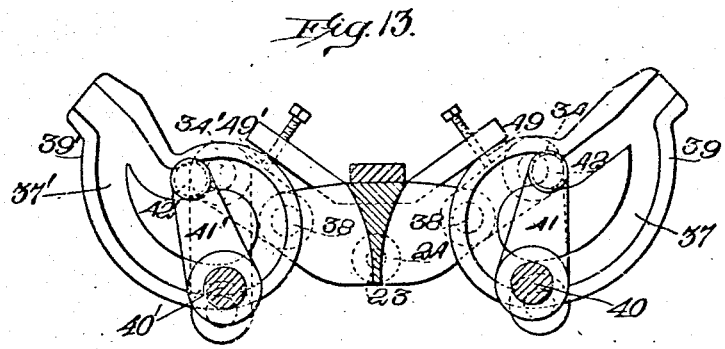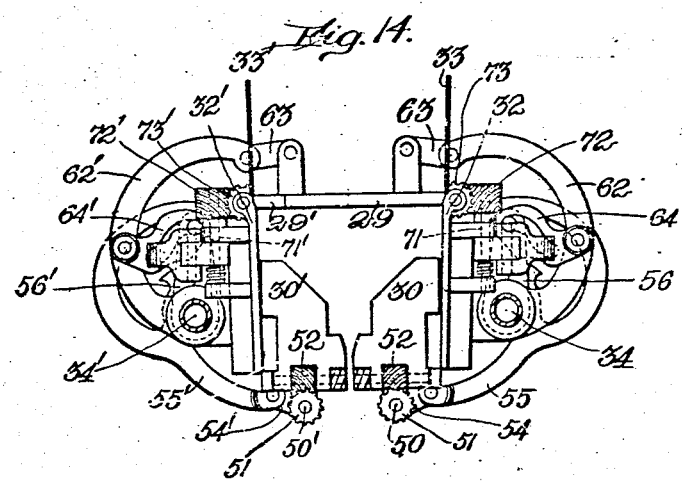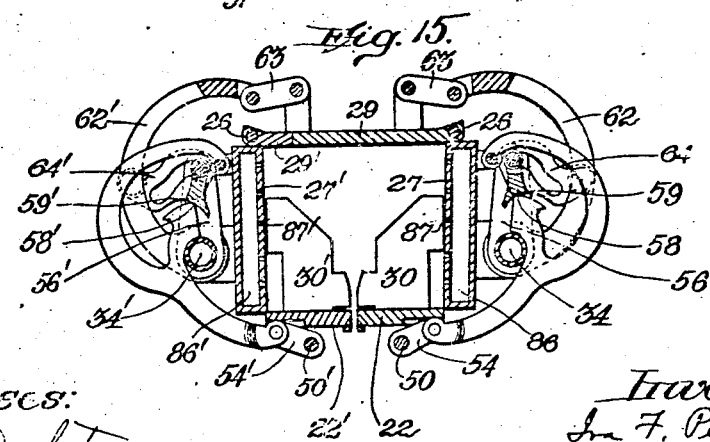

I. F. PECK.
BREAD WRAPPING MACHINE.
APPLICATION FILED MAY 8, 1909.

956,994. Patented May 3, 1910.
9 SHEETS—SHEET 9.

Witnesses:
F. R. Roulstone
E. Batchelder

Inventor:
Ira F. Peck
by Knight Bros Quinby May
Attys.

UNITED STATES PATENT OFFICE.

IRA F. PECK, OF PROVIDENCE, RHODE ISLAND, ASSIGNOR TO BENJAMIN A. BALL AND HENRI A. SÉVIGNÉ, OF BOSTON, MASSACHUSETTS.

BREAD-WRAPPING MACHINE.

956,994.  Specification of Letters Patent.  Patented May 3, 1910.

Application filed May 8, 1909. Serial No. 494,820.

*To all whom it may concern:*

Be it known that I, IRA F. PECK, of Providence, in the county of Providence and State of Rhode Island, have invented certain new and useful Improvements in Bread-Wrapping Machines, of which the following is a specific tion.

This invention has for its object to provide a machine for wrapping loaves of bread, and other objects of like general form in sheets of so-called waxed paper, or other suitable covering material, to protect the wrapped article.

The invention is embodied in a machine which comprises a loaf-supporting bed made in sections which are adapted to be adjusted to a position to support the loaf during the folding operation, and to dump or discharge the loaf after it has been wrapped, a plurality of folding members suitably connected with the loaf supporting bed and adapted to fold a sheet, which is interposed between the bed and the bottom of the loaf over the sides, ends, and top of the loaf, mechanism for operating said folding members in a predetermined order to cause them to completely fold the wrapping sheet over the loaf, said mechanism having provisions for swinging the several folding members from a starting position, in which all of said members lie in the same plane, to a folding position, and back to the starting position, and for moving the bed sections to dump the wrapped loaf and restoring the bed sections to their loaf-supporting position, means being also provided for holding the wrapping sheet yieldingly in contact with certain of the folding members by atmospheric pressure during a part of the folding operation, and additional means being provided for sealing the outer flap of the wrapper at the conclusion of the folding operation.

The invention consists in the several improvements which I will now proceed to describe and claim.

Figure 1:
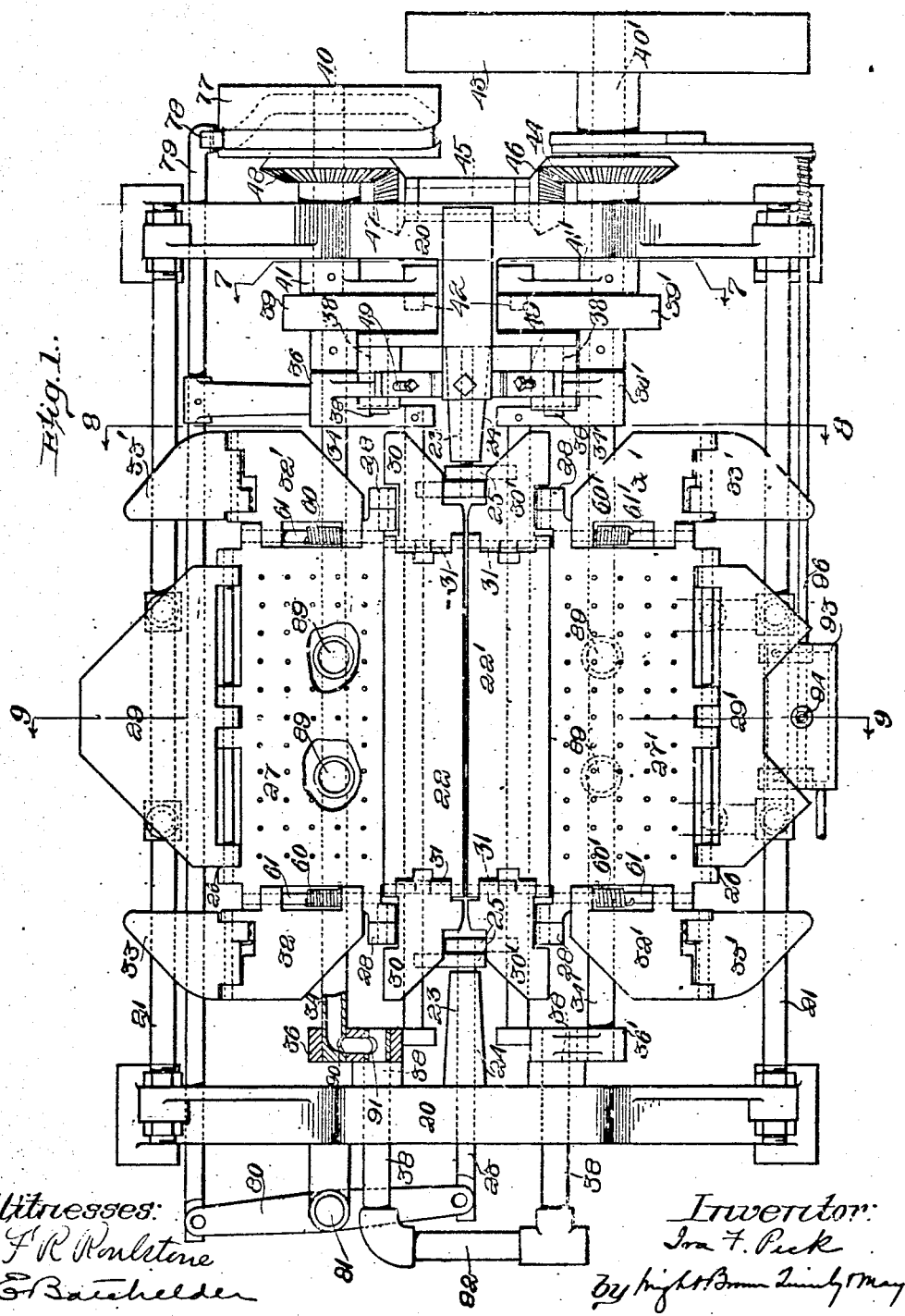
Figure 10:
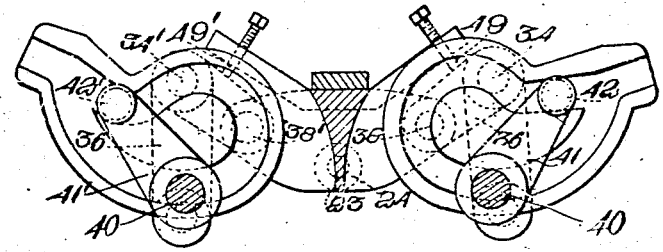
Figure 11:
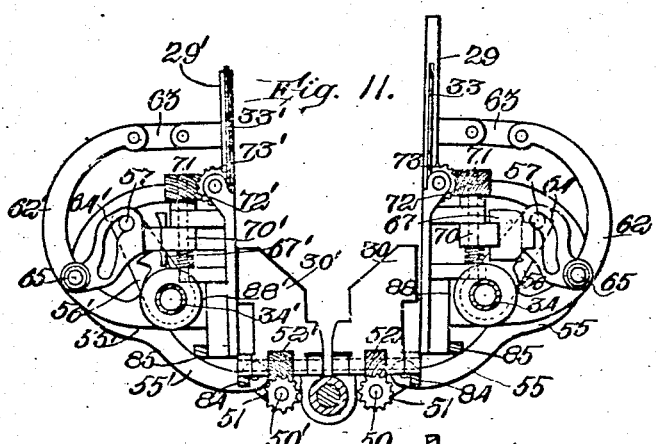
Figure 12:
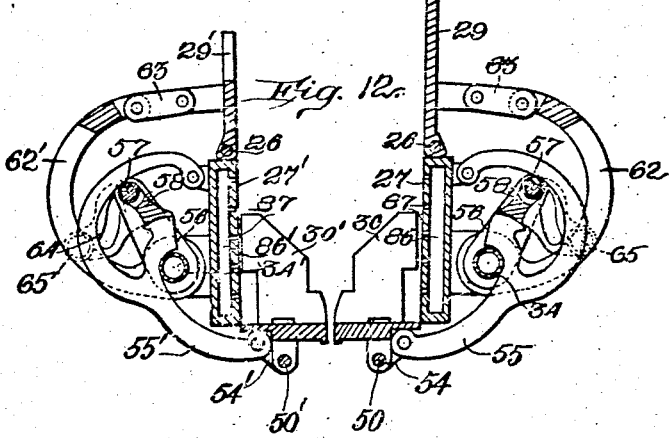
Figure 16:
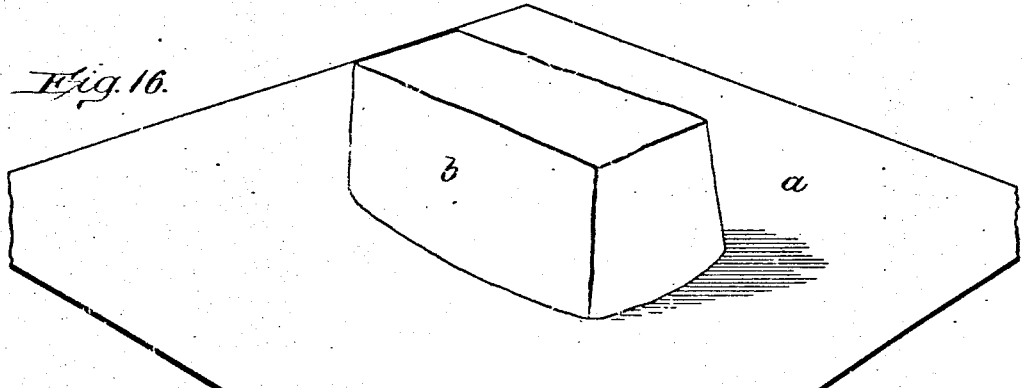
Figure 17:
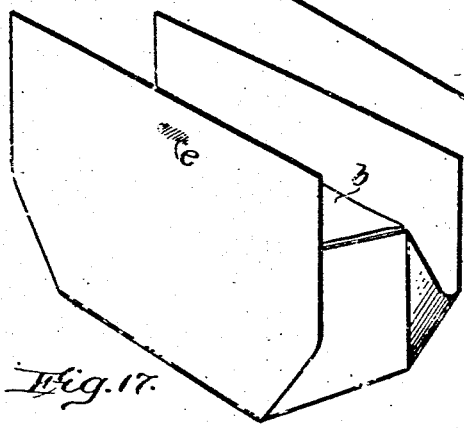
Figure 18:
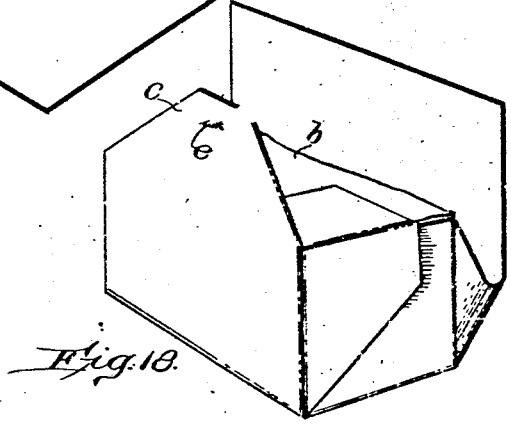
Figure 19:
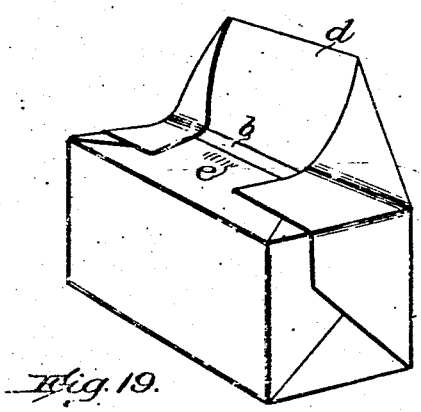
Figure 20:
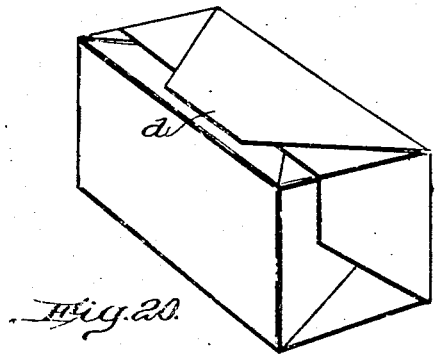

Of the accompanying drawings, forming a part of this specification,—Figure 1 represents a top plan view of a wrapping machine embodying my invention. Fig. 2 represents a bottom plan view of the same. Fig. 3 represents a side elevation. Figs. 3a and 3b represent detail views hereinafter referred to. Fig. 4 represents a view similar to Fig. 3, showing the folding mechanism as it is adjusted during an intermediate state of the folding operation. Fig. 5 represents a view similar to Fig. 4, showing the operation farther advanced. Fig. 6 represents a plan view of the part of the mechanism shown in Fig. 5, showing another state of the operation. Fig. 7 represents a section on line 7—7 of Fig. 1. Fig. 8 represents a section on line 8—8 of Fig. 1. Fig. 9 represents a section on line 9—9 of Fig. 1. Fig. 9a represents a view similar to a portion of Fig. 9, showing the loaf support adjusted to discharge the loaf. Fig. 10 represents a section on line 10—10 of Fig. 4. Fig. 11 represents a section on line 11—11 of Fig. 4. Fig. 12 represents a section on line 12—12 of Fig. 4. Fig. 13 represents a view similar to Fig. 7, showing a different stage of the operation. Fig. 14 represents a section on line 14—14 of Fig. 6. Fig. 15 represents a section on line 15—15 of Fig. 6. Fig. 16 is a perspective view of a loaf lying upon a sheet of wrapping paper. Figs. 17, 18 and 19 represent successive stages of the wrapping operation. Fig. 20 is a perspective view of a completely wrapped loaf.

The same reference characters indicate the same parts in all the figures.

The supporting frame of the machine includes end members 20 connected by horizontal frame rods 21.

22 and 22' represent the sections of the loaf-supporting bed, said bed being initially supported in a horizontal position on the frame as shown in Fig. 9, and adapted to swing downwardly from said position to discharge the wrapped loaf, as shown in Fig. 9a. The bed sections 22 and 22' are supported by bolts 23 (Fig. 2), which are movable longitudinally in fixed sockets 24 and are projected and retracted by means hereinafter described, so that they are adapted to alternately enter and release ears 25 formed on the bed sections 22, 22', and thus support the bed sections in their raised positions, said sections being adapted to swing downwardly by reason of their own weight when the bolts are withdrawn.

27 and 27' represent side plates which are hinged at 28 to the edges of the bed sections 22, 22', and are adapted to lie in the same plane with the bed sections prior to the folding operation, as shown in Fig. 9, and to swing upwardly at right angles with the bed sections as shown in Fig. 12, to fold the wrapping paper against the two opposite sides of the loaf. To the longitudinal outer edges of the side plates 27, 27', are hinged at 26 longitudinal top plates 29 and 29', which are adapted to be swung inwardly as shown in Figs. 14 and 15, to fold the wrapping paper over the top of the loaf, the plate 29 being wider than the plate 29' and having a reduced outer edge adapted to enter a recess in the outer edge of the plate 29', as indicated in Fig. 6. At each end of the bed composed of the members 22 and 22', is a pair of end plates 30 and 30' which are hinged at 31 to the bed members and are adapted to swing upward to a position at right angles with the latter as indicated in Figs. 14 and 15 to fold portions of the wrapping paper against the ends of the loaf. To the ends of the side plates 27, 27' are hinged corner plates 32 and 32' which are adapted to swing inwardly after the side plates 27, 27' have been moved to upright position, the said plates 32, 32' being adapted to fold portions of the paper around perpendicular corners and against the ends of the loaf. To the outer ends of the plates 32, 32' are hinged transverse top plates 33 and 33', these being adapted to swing inwardly to a position at right angles to the plates 32 and 32', and thus fold portions of the paper upon the top of the loaf. The side plates 27, 27' are provided with ears 35 which are loosely mounted upon laterally movable parallel rock-shafts 34, 34' whose ends extend loosely through arms 36 and 36', see Fig. 7. The arms 36 and 36' are pivoted at 38 to fixed parts of the supporting frame, said pivots being in alinement with the hinges 28. The rock-shafts 34 and 34' are adapted to swing laterally in arcs about the pivots 38 for the purpose of actuating the side plates 27, 27', and said rock-shafts are further adapted to rock in their end bearings for the purpose of actuating the top plates 29, 29', and the corner plates 32 and 32' as hereinafter explained. Mechanism is provided for swinging the rock-shafts 34, 34' bodily about their pivots 38 and for rocking said shafts about their own axes, said mechanism including grooved arms 39, 39' affixed to the rock-shafts.

Rotary shafts 40, 40' are journaled in fixed bearings in the end frame 20 and continuously rotated when the machine is in operation by means presently described. Arms 41 and 41' are affixed respectively to the shafts 40 and 40', and are provided with trundle rolls 42 coöperating with the grooves in the arms 39 and 39'. The formation of the grooves is such that a revolution of the trundle rolls 42, due to the rotation of the shafts 40 and 40', causes oscillation of the arms 36 and the rock-shafts 34 and 34' supported thereby, these oscillating movements being sufficient to move the side plates from the position shown in Fig. 9 to that shown in Fig. 12. The shafts 40 and 40' are rotated in unison but in opposite directions by means of a driving pulley 43 affixed to the shaft 40', a beveled gear 44 affixed to said shaft, a transverse shaft 45 having at one end a gear 46 meshing with the gear 44, and at the other end a gear 47 and a gear 48 affixed to the shaft 40 and meshing with the gear 47. The shafts 40 and 40' are driven so as to cause them to rotate in the directions of the arrows in Fig. 7, in which figure, the grooved arms 39, 39' occupy their initial positions in which all of the folding plates lie in the same plane with the bed sections 22, 22' as shown by Figs. 8 and 9.

The arms 41 and 41' in advancing from the positions shown by Fig. 7, cause the arms 39 and 39' to move with them in the directions of the arrows. By reason of the inertia of mechanism adapted to be actuated by the rocking of the shafts 34, 34', said shafts are prevented from rocking during the first movement of the arms 41, 41'. The shafts 34, 34' then instead of being rocked about their axes, are moved laterally about pivots 38 when the arms 41, 41' advance. The arms 36, 36' in swinging about the pivots 38 are permitted to move through 90° of a circle, whereupon they engage adjustable stops 49 mounted upon the end frame 20, see Fig. 10. This lateral movement of the rock-shafts causes the side plates 27, 27' to move to the position shown by Fig. 11, thereby folding the paper against the sides of the loaf and carrying the top plates 29, 29', corner plates 32, 32', and transverse top plates 33, 33'. At the same time the end plates 30, 30' are actuated by mechanism presently described to cause them to swing upwardly so as to fold portions of the paper against the ends of the loaf.

The bed sections 22, 22' are provided with longitudinal rock-shafts 50, 50' journaled in bearings on the under sides of said sections. The ends of the rock-shafts 50, 50' are provided with spiral gears 51 which intermesh with spiral gears 52 affixed to the pivots on the end plates 30, 30'. Springs 53 connected to the rock-shafts 50, 50' tend to turn the said shafts so as to maintain the end plates in their initial positions in the plane of the bed sections. Affixed to the shafts 50, 50' are rock arms 54, 54' which are connected by pivoted links 55, 55' to the side plates 27, 27'. The rock shafts 34, 34' each have a pair of fixed arms 56, 56' whose outer ends are connected by the pins 57. Mounted upon the pins between the arms 56, 56' are spring-actuated pawls 58, 58'. Said pawls are held by their springs in engagement with notches 59, 59' formed in the links 55, 55'. When the side plates 27, 27' are swung upwardly, the links 55, 55' are moved thereby so as to actuate the rock arms 54, 54' and so oscillate the shafts 50, 50' as to move the end plates 30, 30' to upright position. During this movement of the links 55, 55', their ends which are pivoted to the arms 54, 54', are caused to describe the desired movement by reason of the coöperation of the pawls 58, 58' with the notches in said links. The effect of the pawls is to constitute fulcra about which the links may be rocked, so that the ends pivoted to the arms 54, 54' may not swing idly on their pivots instead of actuating said arms.

The side plates 27, 27' and the end plates 30, 30' fold the paper a, Fig. 16, upwardly about the four edges of the bottom of the loaf, and they remain in upright position throughout the remainder of the folding operation. Fig. 17 illustrates the first state of the folding operation in which the paper is folded against the sides and ends of the loaf b. When the side plates arrive at their upright position, the top plate 29' and the corner plates 32' are actuated. The corner plates by reason of the rapidity of movement of their actuators swing in more rapidly than the top plate 29', and the transverse top plates 33' are actuated at the same time so that they arrive at their operative positions before the top plate 29'. The transverse top plates 33' do not remain against the loaf, but while the top plate 29' is descending they return to their remote positions. The folding plates on one side of the machine, with the exception of the side plates 27 and 27' and the end plates 30, 30', are actuated in advance of those on the other side by reason of a slight variation in the shapes of the grooves 37, 37' in the arms 39, 39'. The result of so folding the paper by means of the corner plates 32' and transverse top plates 33' is shown by Fig. 18 which represents the second state of the folding operation. In this figure, the flap c is about to be folded down upon the top of a loaf b by the longitudinal top plate 29'. Just as the flap c is about to engage the previously actuated transverse top plates 33', the corner plates 32' are released and retracted to their outer positions by springs 60 coiled about the hinges 61. The top plate 29' remains in operative position upon the top of the loaf during the succeeding movements of the corner plates 32 and top plates 29 and 34 on the other side of the machine. As in the former instance, the corner plates 32 and transverse top plates 33 are actuated more rapidly than the top plate 29, thereby folding the paper into the form shown by Fig. 19 prior to the folding of the final flap d. As the top plate 29 is in the act of folding down the flap d, the corner plates 32 are released and retracted to their remote positions by springs 60, leaving the top plate 29' still upon the loaf. The top plate 29 then completes its movement so that the flap d is laid upon the flap c and upon the inwardly folded end portions as shown by Fig. 20. This figure represents the final stage of the folding operation upon the completion of which the bed-supporting bolts 23 are withdrawn so as to release the bed sections 22, 22' and permit them to swing downwardly to form a discharge opening through which the folded loaf may gravitate.

The top plates 29 and 29' receive their motion from arms 62, 62' loosely mounted upon the rock-shafts 34, 34'. The free ends of the arms are connected to ears on the top plates by pivoted links 63. Each of said arms is provided with a pair of links 64 pivoted at 65 and formed with irregular slots 66 which are occupied by the ends of the pins 57 which are carried by the arms 56, 56' on the rock-shafts 34, 34'.

When the lateral bodily movement of the rock-shafts is arrested by the fixed stops 49, continued movement of the grooved arms 39, 39' results in oscillation of the rock-shafts about their individual axes. This causes the arms 56, 56' to swing upwardly thereby moving the pins 57 through the slots 66. When the pins 57 reach the outer ends of the grooves, they move the links 64 and thereby swing the arms 62, 62' and cause the top plates 29, 29' to descend upon the top of the loaf. It is this same movement of the links 64 which causes movement of the corner plates 32, 32'. Each of the side plates 27, 27' is provided with a pair of bell crank arms 67, 67' pivoted at 68. The arms extend longitudinally of the side plates and their free ends are pivotally connected at 69 to rock arms 70 secured to rock-shafts 71 mounted on the under sides of the corner plates. Each rock-shaft 71 carries a spiral gear 72 which intermeshes with a spiral gear 73 affixed to the pivot of the transverse top plate associated therewith. Helical springs 74 are coiled about the rock-shaft 71 and exert their tension tending to maintain the transverse top plates in their inoperative positions. The bell crank arms 67, 67' are formed with projections adapted to coöperate with inclined projections 75 formed on the links 64. During the inward movement of the links 64, which swings the top plates 29, 29' down upon the loaf, the projections 75 engage the projections on the bell crank arms 67, 67' and swing said arms about their pivots 68. This causes the corner plates to swing inwardly about their hinges so that they may fold the corners of the paper against the end of the loaf. This same movement of the corner plates causes the partial rotation of the rock-shafts 71 which is imparted to the spiral gears 72 and 73, causing the transverse top plates 33, 33' to descend upon the top of the loaf before the descent of the longitudinal top plates 29, 29'. The arms 56, 56' continue to advance so as to complete the downward movement of the longitudinal top plates, and in so doing they move the projections 75 beyond the projections on the arms 67, 67', thereby releasing said arms and permitting them to recede in response to the tension of helical springs 61 coiled about the hinges of the corner plates. In this way, the corner plates and transverse top plates are enabled to recede immediately after folding the paper against the ends and top of the loaf and thus avoid interference with the oncoming top plates 29, 29'.

The bolts 23 which engage the ears 25 on the bed sections 22, 22' for the purpose of supporting the sections in a horizontal plane, are connected with mechanism adapted to be operated by a cam 77 affixed upon the continuously rotating shaft 40. The cam coöperates with a trundle roll 78 on one end of a rod 79 extending longitudinally of the machine, and having bearings in ears formed on the end frames 20, 20', see Fig. 2. The opposite end of the rod 79 is pivotally connected to one end of a lever 80 fulcrumed at 81 in a bracket supported by the end frame 20'. The other end of the lever 80 is pivotally connected to one of the bolts 23, while the other bolt 23 is provided with a downwardly extending pin 82 engaging an arm 83 rigidly attached to the rod 79. By reason of this mechanism, longitudinal reciprocation of the rod 79 causes the bolts 23 to move in unison but in opposite directions. The cam 77 is timed so as to effect the retraction of the bolts 23 at the completion of the folding operation whereupon the bed sections 22, 22' with the loaf thereon, are released and swung downwardly so as to discharge the loaf. In the meantime, the side plates 27, 27' remain in their upright positions and as the bed sections swing downwardly, each section moves into the vertical plane of its respective side plate. The downward movement of the bed sections is limited by the coöperation of back stops 84, 84' formed on the bed sections and stops 85, 85' on the side plates. The rock-shafts 34, 34', after having moved the top plates 29, 29' to work-engaging position, are rocked in the opposite direction thereby causing the pins 57 to recede in the slots 66. This movement of the pins causes the links 64 to swing upwardly so as to cause the projections 75 to pass over the coöperative projections on the bell crank arms 67, 67', and the links 64 are thus restored to their initial position with the projections 75 on the under side of the bell cranks. The pins 67 upon arriving at the inner ends of the slots 66 impart retrograde movement to the arms 62, 62', thereby swinging the top plates 29, 29' about their hinges 26 to upright position. Continued movement of the rock-shafts 34, 34 restores all of the paper folding members to their initial position in a horizontal plane. The side plates 27, 27' in returning to their initial position elevate the bed sections 22, 22' by reason of the coöperative engagement of the stops 84, 84' with the stops 85, 85'. When the bed sections are thus restored to their initial position, the cam 77 moves the rod 79 in the opposite direction, thereby projecting the locking bolts 23 into the ears 25 so as to lock the bed sections in loaf-supporting position. During this operation, the trundle rolls 42 on the arms 41, 41' occupy concentric portions of the grooves 37 on the arms 39, 39', and the arms 36, 36' which support the rock-shafts 34, 34' are permitted to descend to their initial positions away from the stops 49.

The side plates are of hollow formation as shown by Figs. 9, 12 and 15, and are provided with chambers 86, 86'. These chambers constitute wind boxes and have communication with the atmosphere through ports 87 extending through work-engaging faces of the plates. The chambers are adapted to be evacuated so that, when the ports 87 are covered by a sheet of wrapping paper, the sheet may be held firmly against the side plates by atmospheric pressure on the outer side only. The chambers 86, 86' communicate with a conduit comprising various relatively movable sections for connecting it with a stationary conduit, whereby communication between the chambers and the stationary conduit may be maintained during the movements of the side plates. The rock-shafts 34, 34' and supporting arms 36, 36' form parts of the air conduit and are of hollow formation for this purpose. The hollow portions of the rock-shafts extend through the hollow ears 88, 88' on the side plates and are formed with ports 89 opening into said hollow ears. The ears in turn open into the chambers 86, 86', and in this way form communication between the interior of the side plates and the interior of the rock-shafts. The arms 36, 36' at one end of the machine, preferably the end 20', communicate with the interior of the rock-shafts through the ports 90 formed in the shafts. The ends of the shafts are of course closed. The pivot studs 38 upon which the arms 36 swing are also hollow and are provided with ports 91 which communicate with the interior of the hollow arms 36, 36'. The pivot studs 38 may both be connected to a conduit 92 provided with any suitable machine for exhausting the air from the conduit. The ports 87, 89 and 90 are preferably somewhat elongated so as to preserve continuity of the air conduit throughout the several movements of the parts in wrapping a loaf, and in this way, the chambers 86, 86' may be continually evacuated for the purpose of enabling atmospheric pressure on one side of the paper sheet to hold the same firmly in contact with the side plates and so prevent it from becoming dislodged.

Means is provided for applying a quantity of paste to the marginal portion of the paper $a$ which comes within the limits of the flap $c$ when the paper is folded as hereinbefore described, so that, when the said flap is folded down upon the top of the loaf, the paste lies upon the outer surface in position to adhere to the final flap $d$ when the latter is folded upon the flap $c$. In this way, the previously folded portions of the paper are confined by the flaps $c$ and $d$. In order to cause the paste to lie upon the upper surface of the flap $c$ when said flap is folded upon the loaf, it is necessary to apply the paste to the under side of the paper in case it is desired to apply the paste before the paper is folded.

Figs. 1, 3, 3$^a$ and 3$^b$, illustrate a paste reservoir having a nozzle which is adapted to deliver paste to the under side of a sheet $a$ when the sheet is lying on the bed and folding plates in their initial horizontal position. The reservoir is indicated at 93 and the end of the nozzle at 94. The reservoir is below the plane of the paper and the end of the nozzle lies in the plane of the paper, and the formation and arrangement of that part of the nozzle which communicates with the interior of the reservoir is such that the paste contained therein is adapted to be forced out by air pressure within the reservoir. 95 represents an air conduit of which the remote end, not shown, may be connected to any suitable pump for forcing air toward the reservoir, and by this arrangement of parts, the paste may be expelled upwardly through the nozzle so that it may impinge against the under side of the paper.

The nozzle is provided with a stop cock 96 by which the discharge of paste may be controlled. The stop cock is provided with an arm 97 which is pivotally connected with one end of a link 98 which extends through a snug fitting aperture in the wall of the reservoir and whose other end is pivotally connected to one end of an actuator 99. The other end of the actuator is forked and embraces a continuously revolving shaft 100 which may be connected by suitable power-transmitting mechanism with the prime power shaft 40 so as to revolve in unison therewith. The actuator 99 is normally retracted toward the shaft by a spring 101 and it is provided with a trundle roll 102 which is held by the spring in coöperative engagement with a cam 103 affixed to the shaft 100. The cam is adapted to advance the actuator in the opposite direction and together with the spring it affords means for alternately opening and closing the stop cock 96 so as to control the discharge of the paste.

It may be seen by reference to Fig. 1 that the nozzle 94 coincides with the recess of the top plate 29', said recess being formed for the purpose of admitting the nozzle to the position where it may engage the marginal portion of the paper sheet at the desired distance in from the edge. This side plate as previously explained, is actuated to fold the flap $c$ upon the top of the loaf prior to actuation of the top plate 27' which folds the flap $d$. The plate 29, which is considerably broader than the plate 29' and which is formed to enter the recess in the plate 29' as previously explained, is adapted to overlie the paste laden flap so as to press the final flap firmly upon the body of paste indicated at $e$ in Figs. 16 to 19 inclusive.

Although no mechanism is illustrated in connection with this invention for feeding the sheets of paper one by one to the bed sections, the provision of suitable mechanism for so feeding the sheets of paper is contemplated, but inasmuch as it would form no part of the present invention it is purposely omitted. For the present purpose it may be assumed that the paper sheets are placed upon the bed by hand or by any one of several known mechanisms for feeding paper sheets one by one.

I claim:

1. In a machine for wrapping a sheet of paper about an article, a bed for the wrapping sheet with the article lying in the center thereof, side plates and end plates hinged to the bed and adapted to fold the sheet upwardly against the sides and ends of the article, corner plates hinged to the side plates and adapted to fold the projecting corners of the paper against the ends of the article, top plates hinged to the corner plates, and top plates hinged to the side plates, all of said top plates being adapted to fold the upwardly projecting portions of the paper toward each other and upon the top of the article.

2. In a machine for wrapping a sheet of paper about an article, a bed for supporting a sheet of paper with the article thereon, means for applying paste to the under side of a sheet so supported, a plurality of plates hingedly connected to the bed for folding the sheet upwardly against the sides and ends of the article, and a plurality of plates hingedly connected to said first plurality of plates for holding the upturned portions of the sheet against the ends and top of the article, said plates lying initially in the plane of the bed and operating in such order as to fold the paste-laden portion lastly and to fold the other portions so as to be confined by the paste-laden portion.

3. In a machine for wrapping a sheet of paper about an article, a bed for supporting a sheet of wrapping paper with the article thereon, a paste reservoir having a nozzle arranged to discharge paste upon the marginal portion of the paper in its initial position in the folding devices, means for controlling the flow of paste from the reservoir, a plurality of hingedly connected plates adapted to fold the paper over the sides, ends and top of the article, and means for actuating said plates in a predetermined order, so as to cause the paste laden portion to engage the opposite portion after the other portions have been folded inwardly so as to be confined thereby.

4. In a machine for wrapping a sheet of paper about an article, a bed for supporting a sheet of wrapping paper with the article thereon, means for wrapping the marginal portion of the paper over the sides, ends, and top of the article, including hollow plates having ports extending through the work-engaging face to the interior, and conduits terminating in the chambers within said plates whereby said chambers may be evacuated.

5. In a machine for wrapping a sheet of paper about an article, a bed composed of movable sections adapted to lie in a horizontal plane and there support a sheet of wrapping paper with a loaf thereon, and to separate so as to form a discharge opening through which the article may gravitate, a plurality of plates hingedly connected with the bed and adapted to fold the marginal portion of the paper over the sides, ends and top of the article, means for actuating the plates so as to wrap the article, and means for releasing the bed sections at the completion of the wrapping operation so as to discharge the article thereon.

6. In a machine for wrapping a sheet of paper about an article, a bed composed of movable sections adapted to lie in a horizontal plane and there support a sheet of wrapping paper with a loaf thereon and to swing downwardly and away from each other so as to form a discharge opening through which the article may gravitate, movable means for supporting the bed sections in operative position, a plurality of hinged plates adapted to fold the marginal portion of the paper about the sides, ends and top of the article, means for actuating the plates, and means for moving the bed-supporting means at the completion of the wrapping operation so as to release the bed sections and permit them to swing open.

7. In a machine for wrapping a sheet of paper about an article, a bed for supporting a sheet of paper with the article thereon, side plates and end plates hinged to the bed and adapted to fold the paper against the sides and ends of the article, means for actuating the side plates, and means for actuating the end plates through the medium of the side plates.

8. In a machine for wrapping a sheet of paper about an article, a bed for supporting a sheet of paper with the article thereon, side plates hinged to the bed, end plates hinged to the bed transversely of the side plate hinges, said plates being adapted to fold the paper against the sides and ends of the article, means for actuating the side plates, and means actuated by the side plates for actuating and returning the end plates.

9. In a machine for wrapping a sheet of paper about an article, a bed for supporting a sheet of paper with the article thereon, side plates adapted to swing and fold the paper against the sides of the article, corner plates hingedly connected to the ends of the side plates and adapted to fold the paper against the ends of the article, means for swinging the side plates, and means carried by the side plates for swinging the corner plates.

10. In a machine for wrapping a sheet of paper about an article, a bed for supporting a sheet of paper with the article thereon, side plates adapted to swing and fold the paper against the sides of the article, longitudinal top plates hinged to the side plates and adapted to fold the paper upon the top of the article, corner plates hinged to the ends of the side plates and adapted to fold the paper against the ends of the article, transverse top plates hinged to the corner plates and adapted to fold the paper upon the top of the article, means for actuating the side plates, means moved by said first means for actuating the longitudinal top plates, means moved by said second means for actuating the corner plates, and spiral gears connecting said corner plates and transverse top plates and moved by said third means for actuating the transverse top plates.

11. In a machine for wrapping a sheet of paper about an article, a bed for supporting the paper with the article thereon, a pair of hinged side plates for folding the paper against opposite sides of the article, end plates adapted for folding the paper against the ends of the article, means connecting the side and end plates whereby movement of the side plates actuates the end plates, top plates and corner plates carried by the side plates in hinged relation, a pair of rock-shafts carried by the side plate in parallel but eccentric relation to the hinges thereof, means for moving the rock-shafts bodily about the hinge axes so as to actuate the side plates, said means being also adapted to rock the shafts on their own axes, and means adapted to be actuated by rotation of the rock-shafts for actuating the top and corner plates.

12. In a machine for wrapping articles with paper, a bed for supporting a sheet of paper with an article thereon, a paste reservoir with a nozzle arranged to engage the marginal portion of the paper on the bed, a stop cock for said nozzle, means for opening and closing said cock, a conduit terminating in said reservoir, whereby the contents may be subjected to air pressure, and wrapping mechanism, comprising a plurality of swinging plates adapted and actuated to fold the paper about the article so as to confine the folds by the paste laden portion.

In testimony whereof I have affixed my signature, in presence of two witnesses.

IRA F. PECK.

Witnesses:
E. BATCHELDER,
P. W. PEZZETTI.